(12) United States Patent
Kachita et al.

(10) Patent No.: US 11,228,375 B2
(45) Date of Patent: Jan. 18, 2022

(54) TRANSMISSION SYSTEM, TRANSMISSION DEVICE, AND TRANSMISSION METHOD

(71) Applicant: FUJITSU LIMITED, Kawasaki (JP)

(72) Inventors: Yoshito Kachita, Kawasaki (JP); Takashi Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/560,176

(22) Filed: Sep. 4, 2019

(65) Prior Publication Data

US 2020/0106531 A1 Apr. 2, 2020

(51) Int. Cl.
| | |
|---|---|
| *H04B 10/67* | (2013.01) |
| *H04B 10/077* | (2013.01) |
| *H04B 10/564* | (2013.01) |
| *H04J 14/02* | (2006.01) |
| *H04B 10/40* | (2013.01) |

(52) U.S. Cl.
CPC ......... *H04B 10/674* (2013.01); *H04B 10/077* (2013.01); *H04B 10/564* (2013.01); *H04J 14/02* (2013.01); *H04B 10/40* (2013.01)

(58) Field of Classification Search
None
See application file for complete search history.

(56) References Cited

U.S. PATENT DOCUMENTS

| | | | |
|---|---|---|---|
| 2004/0052524 A1* | 3/2004 | Arnold ................. | H04B 10/296 398/38 |
| 2007/0077073 A1 | 4/2007 | Shimada | |
| 2009/0169212 A1* | 7/2009 | Onaka .................. | H04B 10/077 398/79 |
| 2015/0125145 A1* | 5/2015 | Takeyama ............... | H04B 3/46 398/34 |

FOREIGN PATENT DOCUMENTS

| | | |
|---|---|---|
| JP | 2007-104103 | 4/2007 |
| JP | 2009-159290 | 7/2009 |

* cited by examiner

*Primary Examiner* — David W Lambert
(74) *Attorney, Agent, or Firm* — Fujitsu Patent Center

(57) ABSTRACT

A transmission device configured to transmit main signal light to another transmission device through a transmission line, the transmission device includes a transceiver configured to output supervisory signal light including information on supervisory control on the transmission device and the other transmission device, an attenuator configured to attenuate the supervisory signal light, a combiner configured to combine the supervisory signal light to the main signal light, and a control circuit configured to control an attenuation amount of the attenuator so that power of the supervisory signal light received by the other transmission device approaches a given target value.

18 Claims, 8 Drawing Sheets

TRANSMISSION SYSTEM, TRANSMISSION DEVICE, AND TRANSMISSION METHOD

CROSS-REFERENCE TO RELATED APPLICATION

This application is based upon and claims the benefit of priority of the prior Japanese Patent Application No. 2018-181785, filed on Sep. 27, 2018, the entire contents of which are incorporated herein by reference.

FIELD

The embodiments discussed herein are related to a transmission system, a transmission device, and a transmission method.

BACKGROUND

In a case where supervisory signal light of a transmission system is combined to main signal light including light of a plurality of wavelengths multiplexed by wavelength division multiplexing and the resultant is transmitted, for example, a transmission device on a transmission side includes a supervisory signal light amplification unit independently of a main signal light amplification unit so that an optical transmission device on a reception side positively receives the supervisory signal light. As the related art, for example, Japanese Laid-open Patent Publication No. 2009-159290 is given.

In the above-mentioned case, when the transmission power of the supervisory signal light is increased by amplification, in a transmission line, a nonlinear optical effect such as cross-phase modulation may possibly occur in the main signal light and the supervisory signal light, resulting in a deterioration in transmission quality of the main signal light. Meanwhile, when the power of the supervisory signal light is reduced, the nonlinear optical effect may be reduced, but the supervisory signal light may possibly be not received normally due to the insufficient power of the supervisory signal light, resulting in a reduction in supervisory control function of the transmission device.

In view of the above, it is desired to provide a transmission system, a transmission device, and a transmission method that may reduce a nonlinear optical effect without a reduction in supervisory control function.

SUMMARY

According to an aspect of the embodiment, a transmission device configured to transmit main signal light to another transmission device through a transmission line, the transmission device includes a transceiver configured to output supervisory signal light including information on supervisory control on the transmission device and the other transmission device, an attenuator configured to attenuate the supervisory signal light, a combiner configured to combine the supervisory signal light to the main signal light, and a control circuit configured to control an attenuation amount of the attenuator so that power of the supervisory signal light received by the other transmission device approaches a given target value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

First Embodiment

Figure 1:
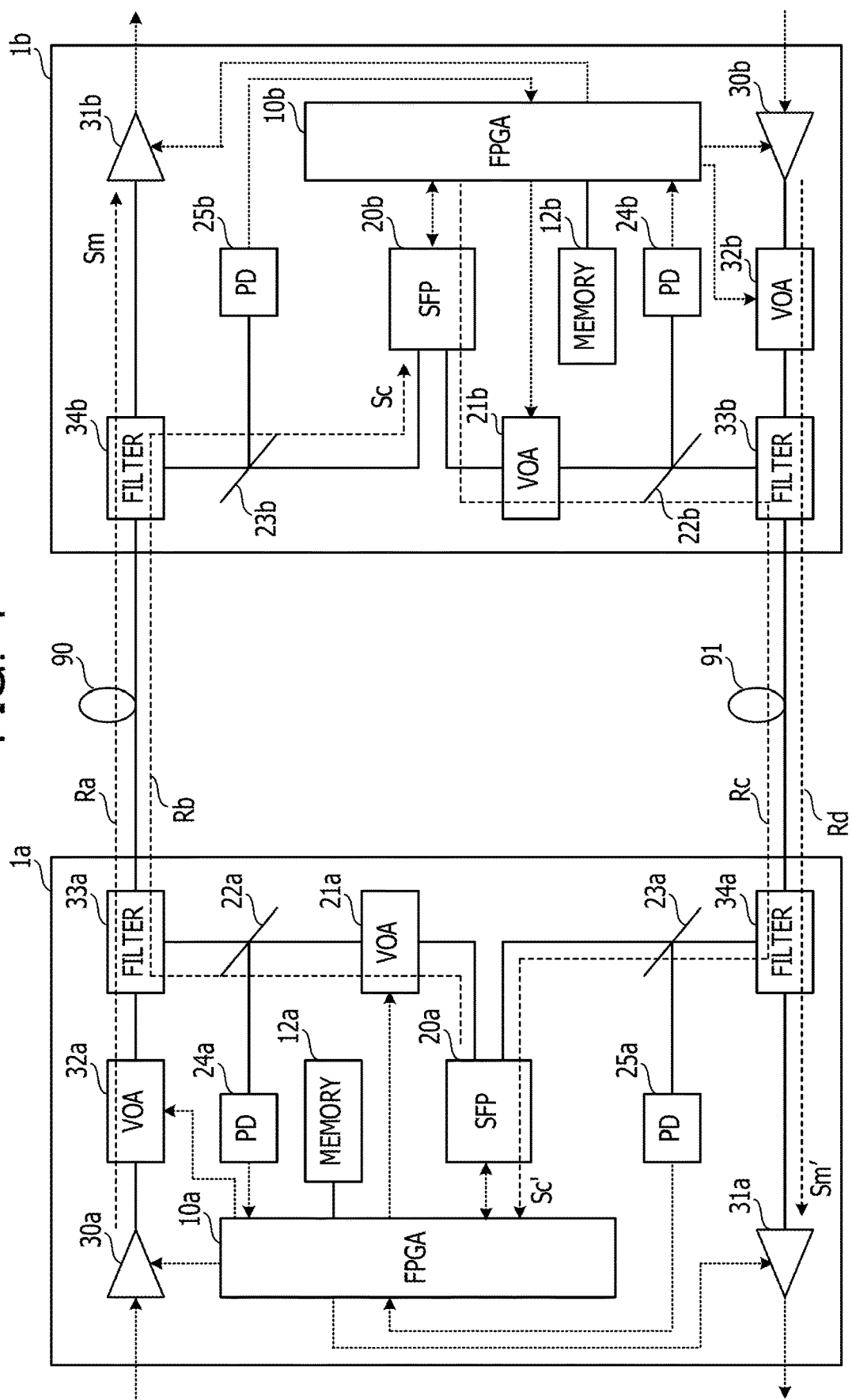
FIG. 1 is a configuration diagram illustrating a transmission system according to a first embodiment.

FIG. 1 is a configuration diagram illustrating a transmission system according to a first embodiment. The transmission system includes a pair of transmission devices 1a and 1b coupled to each other through transmission lines 90 and 91, such as optical fibers.

The transmission devices 1a and 1b are each a wavelength division multiplexing transmission device, for example, a reconfigurable optical add-and-drop multiplexer (ROADM). One of the transmission devices 1a and 1b transmits, to the other of the transmission devices 1b and 1a, main signal light Sm or Sm' including light of a plurality of different wavelengths multiplexed by wavelength division multiplexing. In an example described later, there is described processing for transmitting the main signal light Sm from the transmission device 1a to the transmission device 1b through the transmission line 90. However, processing for transmitting the main signal light Sm' from the transmission device 1b to the transmission device 1a through the transmission line 91 is also performed in a similar manner.

The transmission device 1a is an example of a first transmission device, and transmits the main signal light Sm to the transmission line 90. On the main signal light Sm, light having a plurality of wavelengths and including user data such as an Ethernet (registered trademark) (the same applies hereinafter) frame is multiplexed by wavelength division multiplexing. The transmission device 1b is an example of a second transmission device, and receives the main signal light Sm from the transmission device 1a through the transmission line 90. Reference character Ra represents the path of the main signal light Sm that is transmitted from the transmission device 1a to the transmission device 1b, and reference character Rd represents the path of the main signal light Sm' that is transmitted from the transmission device 1b to the transmission device 1a.

One of the transmission devices 1a and 1b combines supervisory signal light Sc or Sc' to the main signal light Sm or Sm' and transmits the resultant to the other of the transmission devices 1b and 1a. The supervisory signal light beams Sc and Sc' include information on supervisory control by the corresponding transmission devices 1a and 1b (alarm, for example; hereinafter referred to as "supervisory control information"). The supervisory signal light beams Sc and Sc' have a wavelength different from the wavelength band of the wavelength light of the main signal light beams Sm and Sm' by a given wavelength band. Reference character Rb represents the path of the supervisory signal light Sc that is transmitted from the transmission device 1a to the transmission device 1b, and reference character Re represents the path of the supervisory signal light Sc' that is transmitted from the transmission device 1b to the transmission device 1a.

When the supervisory signal light Sc has too strong transmission power, in the transmission line 90, a nonlinear optical effect such as cross-phase modulation may possibly occur in the main signal light Sm and the supervisory signal light Sc, resulting in a deterioration in transmission quality of the main signal light Sm.

The transmission device 1a includes a field programmable gate array (FPGA) 10a, a memory 12a, a small form-factor pluggable (SFP) 20a, optical amplifiers 30a and 31a, and VOAs 21a and 32a. The transmission device 1a further includes optical splitters 22a and 23a, filters 33a and 34a, and photo diodes (PDs) 24a and 25a. The transmission device 1b includes, like the transmission device 1a, an FPGA 10b, a memory 12b, an SFP 20b, optical amplifiers 30b and 31b, VOAs 21b and 32b, optical splitters 22b and 23b, filters 33b and 34b, and PDs 24b and 25b.

The optical amplifiers 30a and 30b amplify the main signal light beams Sm and Sm' input from adjacent nodes, respectively. The FPGAs 10a and 10b control the gain of the optical amplifier 30a and the gain of the optical amplifier 30b, respectively. The main signal light Sm is input from the optical amplifier 30a to the VOA 32a, while the main signal light Sm' is input from the optical amplifier 30b to the VOA 32b. The VOAs 32a and 32b attenuate the main signal light beams Sm and Sm', respectively. The FPGAs 10a and 10b control the attenuation amount of the VOA 32a and the attenuation amount of the VOA 32b, respectively. The main signal light Sm is input from the VOA 32a to the filter 33a, while the main signal light Sm' is input from the VOA 32b to the filter 33b.

The SFPs 20a and 20b are each an optical module and are removably mountable on the transmission devices 1a and 1b, respectively. The SFPs 20a and 20b each transmit or receive the supervisory signal light Sc or Sc'. In the present example, the SFP 20a of the transmission device 1a is an example of an output unit, and outputs the supervisory signal light Sc. The SFP 20b of the transmission device 1b is an example of a reception unit, and receives the supervisory signal light Sc.

The supervisory signal light Sc is input from the SFP 20a to the VOA 21a. The VOA 21a is an example of an attenuation unit, and attenuates the supervisory signal light Sc. The FPGA 10a is an example of a control unit, and controls the attenuation amount of the VOA 21a. The supervisory signal light Sc is input from the VOA 21a to the filter 33a through the optical splitter 22a.

The supervisory signal light Sc' is input from the SFP 20b to the VOA 21b. The VOA 21b attenuates the supervisory signal light Sc'. The FPGA 10b controls the attenuation amount of the VOA 21b. The supervisory signal light Sc' is input from the VOA 21b to the filter 33b through the optical splitter 22b.

The optical splitter 22a introduces the supervisory signal light Sc to the filter 33a and the PD 24a in a separate manner. The optical splitter 22b introduces the supervisory signal light Sc' to the filter 33b and the PD 24b in a separate manner. The PD 24a performs optical-electrical conversion on the supervisory signal light Sc to detect the power of the supervisory signal light Sc. The PD 24b performs optical-electrical conversion on the supervisory signal light Sc' to detect the power of the supervisory signal light Sc'. For example, the FPGA 10a monitors the transmission state of the supervisory signal light Sc based on the power detected by the PD 24a, and the FPGA 10b monitors the transmission state of the supervisory signal light Sc' based on the power detected by the PD 24b.

The filter 33a is an example of a combining unit, and combines the supervisory signal light Sc to the main signal light Sm. The filter 33b combines the supervisory signal light Sc' to the main signal light Sm'. The filters 33a and 33b may be filters having a wavelength division multiplexing function, for example, but are not limited thereto. The combined light of the supervisory signal light Sc and the main signal light Sm is output from the filter 33a to the transmission line 90, while the combined light of the supervisory signal light Sc' and the main signal light Sm' is output from the filter 33b to the transmission line 91.

The combined light of the supervisory signal light Sc and the main signal light Sm is input to the filter 34b through the transmission line 90. The filter 34b is an example of a splitting unit, and splits the combined light input through the transmission line 90 into the main signal light Sm and the supervisory signal light Sc.

The combined light of the supervisory signal light Sc' and the main signal light Sm' is input to the filter 34a through the transmission line 91. The filter 34a splits the combined light input through the transmission line 91 into the main signal light Sm' and the supervisory signal light Sc'.

The main signal light Sm' is input from the filter 34a to the optical amplifier 31a. The main signal light Sm is input from the filter 34b to the optical amplifier 31b. The optical amplifiers 31a and 31b amplify the main signal light beams Sm' and Sm, respectively. The FPGAs 10a and 10b control the gain of the optical amplifier 31a and the gain of the optical amplifier 31b, respectively. The main signal light beams Sm' and Sm are output from the optical amplifiers 31a and 31b to the adjacent nodes, respectively.

The supervisory signal light Sc is input from the filter 34b to the optical splitter 23b, while the supervisory signal light Sc' is input from the filter 34a to the optical splitter 23a. The optical splitter 23b introduces the supervisory signal light Sc to the SFP 20b and the PD 25b in a separate manner, while the optical splitter 23a introduces the supervisory signal light Sc' to the SFP 20a and the PD 25a in a separate manner.

The SFP 20a receives the supervisory signal light Sc' and outputs the supervisory signal light Sc' to the FPGA 10a. The SFP 20b receives the supervisory signal light Sc and outputs the supervisory signal light Sc to the FPGA 10b. The FPGA 10a extracts supervisory control information from the payload data of the supervisory signal light Sc'. The FPGA 10b extracts supervisory control information from the payload data of the supervisory signal light Sc. The FPGA 10a controls the gains of the optical amplifiers 30a and 31a and the attenuation amounts of the VOAs 21a and 32a based on the supervisory control information, for example. The FPGA 10b controls the gains of the optical amplifiers 30b and 31b and the attenuation amounts of the VOAs 21b and 32b based on the supervisory control information, for example.

The PD 25b is an example of a first detection unit, and performs optical-electrical conversion on the supervisory signal light Sc to detect the power of the supervisory signal light Sc. Information on the power of the supervisory signal light Sc (hereinafter referred to as "power information") is input from the PD 25b to the FPGA 10b. The FPGA 10b inserts the power information into the payload data of the supervisory signal, thereby outputting the power information to the SFP 20b. The PD 25a performs optical-electrical conversion on the supervisory signal light Sc' to detect the power of the supervisory signal light Sc', thereby notifying the FPGA 10a of the power.

The SFP 20b performs electrical-optical conversion on the supervisory signal to generate and output the supervisory signal light Sc'. With this, the power information is notified from the transmission device 1b on the reception side that has received the supervisory signal light Sc to the transmission device 1a on the transmission side that has transmitted the supervisory signal light Sc. The FPGA 10b of the transmission device 1b on the reception side is an example of a notification unit configured to notify the transmission device 1a on the transmission side of the power of the supervisory signal light Sc detected by the PD 25b.

The SFP 20a of the transmission device 1a on the transmission side receives the supervisory signal light Sc' from the transmission device 1b on the reception side. The SFP 20a performs optical-electrical conversion on the supervisory signal light Sc' to reproduce the supervisory signal and outputs the supervisory signal to the FPGA 10a. The FPGA 10a extracts the power information from the payload data of the supervisory signal.

The FPGA 10a controls the attenuation amount of the VOA 21a based on the power information. With this, the supervisory signal light Sc is attenuated by the VOA 21a by an appropriate attenuation amount.

The memory 12a stores, for example, various parameters to be used in the processing by the FPGA 10a. The memory 12b stores, for example, various parameters to be used in the processing by the FPGA 10b. The FPGA 10a writes information to the memory 12a and reads out information from the memory 12a. The FPGA 10b writes information to the memory 12b and reads out information from the memory 12b.

For example, the supervisory signal light Sc is transmitted from the transmission device 1a on the transmission side to the transmission device 1b on the reception side along the path Rb. The transmission device 1b on the reception side detects, by the PD 25b, the power of the supervisory signal light Sc received from the transmission device 1a on the transmission side, and notifies, by the FPGA 10b, the transmission device 1a on the transmission side of the power information along the path Rc. The transmission device 1a on the transmission side controls, by the FPGA 10a, the attenuation amount of the VOA 21a based on the notified power information. The operations of the transmission devices 1a and 1b in this case are described below.

Figure 2:
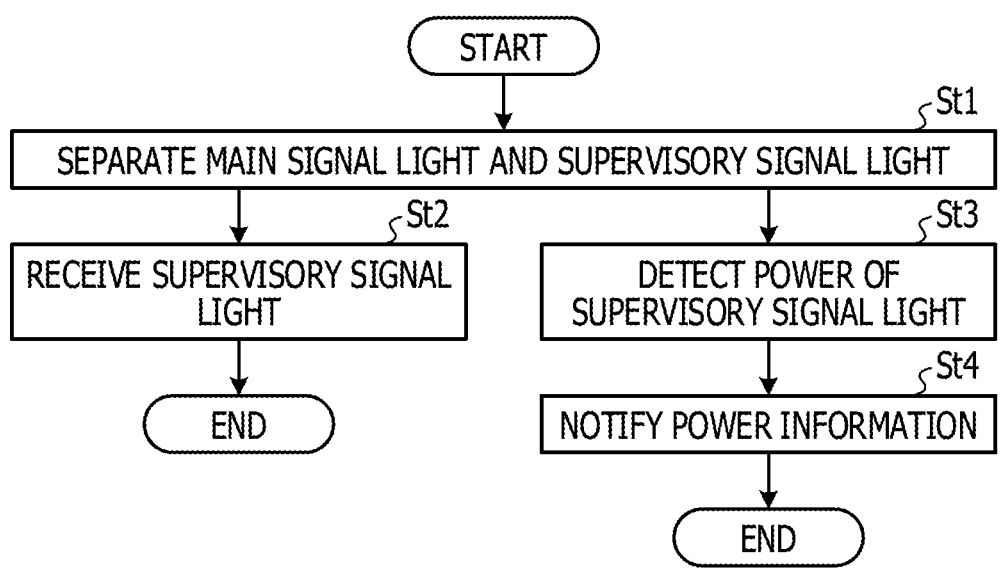
FIG. 2 is a flow chart illustrating an example of processing of supervisory signal light in a transmission device on a reception side.

FIG. 2 is a flow chart illustrating an example of processing of the supervisory signal light Sc in the transmission device 1b on the reception side. In FIG. 2, the processing in Step St2 and the processing in each of Steps St3 and St4 are performed in parallel to each other. This processing is executed repeatedly.

The filter 34b splits, into the main signal light Sm and the supervisory signal light Sc, the combined light input from the transmission device 1a on the transmission side through the transmission line 90 (Step SU). The SFP 20b receives the supervisory signal light Sc obtained by splitting (Step St2). The main signal light Sm is input to the optical amplifier 31b to be amplified.

The PD 25b detects the power of the supervisory signal light Sc obtained by splitting (Step St3). Next, the FPGA 10b inserts the power information into the payload data of the supervisory signal light Sc', which is light in the opposite direction, to thereby notify the transmission device 1a on the transmission side of the power information (Step St4). The transmission device 1b on the reception side processes the supervisory signal light Sc and the main signal light Sm in this way.

Figure 3:
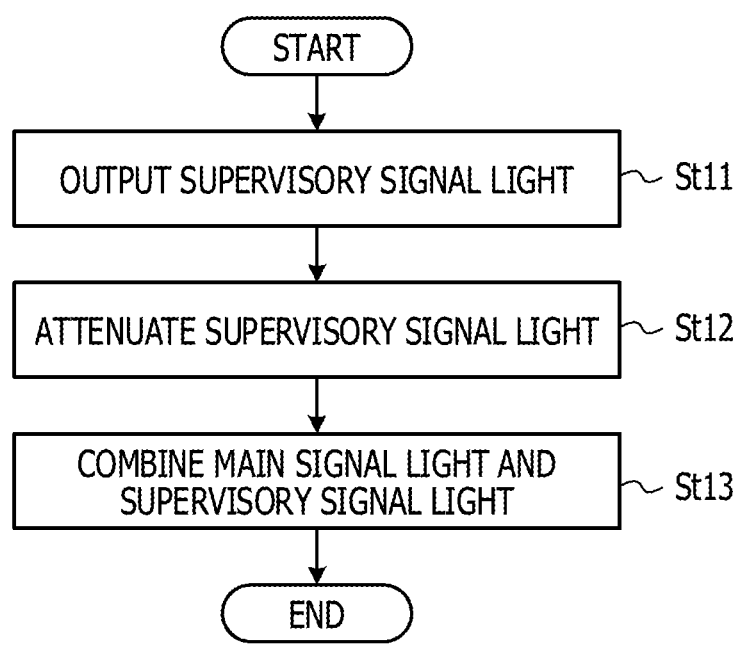
FIG. 3 is a flow chart illustrating an example of transmission processing of supervisory signal light in a transmission device on a transmission side.

FIG. 3 is a flow chart illustrating an example of transmission processing of the supervisory signal light Sc in the transmission device 1a on the transmission side. This processing is repeatedly executed.

The SFP 20a of the transmission device 1a on the transmission side outputs the supervisory signal light Sc (Step St11). Next, the VOA 21a attenuates the supervisory signal light Sc by the attenuation amount set by the FPGA 10a (Step St12).

Next, the filter 33a combines the main signal light Sm and the supervisory signal light Sc (Step St13). At this time, the combined light is output to the transmission line 90. The transmission device 1a on the transmission side executes the transmission processing of the supervisory signal light Sc in this way.

Figure 4:
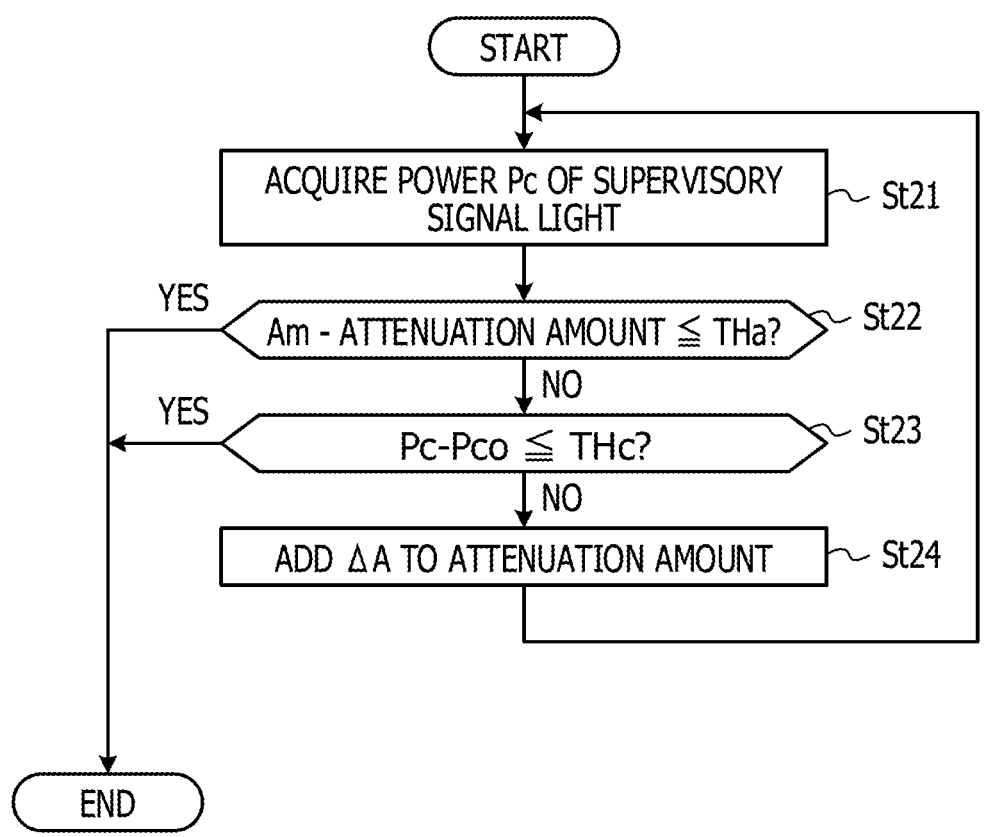
FIG. 4 is a flow chart illustrating an example of control processing of an attenuation amount in a transmission device on a transmission side.

FIG. 4 is a flow chart illustrating an example of control processing of the attenuation amount in the transmission device 1a on the transmission side. Prior to the processing, the attenuation amount of the VOA 21a is set to a lower limit value.

In the transmission device 1a on the transmission side, as the power information, the FPGA 10a acquires, from the payload data of the supervisory signal light Sc' received by the SFP 20a, power Pc of the supervisory signal light Sc detected by the PD 25b of the transmission device 1b on the reception side (Step St21).

Next, the FPGA 10a compares, to a threshold THa, a difference between a current attenuation amount of the VOA 21a and an upper limit value Am of the attenuation amount of the VOA 21a (Step St22). The upper limit value Am is determined depending on the attenuation performance of the VOA 21a of the transmission device 1a. The current attenuation amount is stored in the memory 12a, for example.

In a case where the difference between the attenuation amount and the upper limit value Am is equal to or smaller than the threshold THa (Yes in Step St22), the FPGA 10a determines that it is difficult to set the attenuation amount of the VOA 21a of the transmission device 1a to a value larger than the current setting value, and ends the control processing. The threshold THa is an example of a second threshold, and is a value small enough that, with the difference equal to or smaller than the threshold THa, the attenuation amount may be regarded as being substantially equal to the upper limit value Am.

In a case where the difference between the attenuation amount and the upper limit value Am is larger than the threshold THa (No in Step St22), the FPGA 10a compares, to a threshold THc, a difference between the power Pc of the supervisory signal light Sc and minimum reception power Pco of the SFP 20b of the transmission device 1b on the reception side (Step St23). The minimum reception power Pco is an example of a target value of the power Pc of the supervisory signal light Sc.

In a case where the difference between the power Pc and the minimum reception power Pco is equal to or smaller than the threshold THc (Yes in Step St23), the FPGA 10a determines that the power Pc is substantially equal to the minimum reception power Pco and ends the control processing. The threshold THc is an example of a first threshold, and is a value small enough that, with the difference equal to or smaller than the threshold THc, the power Pc may be regarded as being substantially equal to the minimum reception power Pco.

In a case where the difference between the power Pc and the minimum reception power Pco is larger than the threshold THc (No in Step St23), the FPGA 10a adds ΔA to the attenuation amount of the VOA 21a (Step St24). At this time, the FPGA 10a sets an attenuation amount increased by ΔA to the VOA 21a. Thus, the power (transmission power) of the supervisory signal light Sc that is transmitted from the transmission device 1a on the transmission side is reduced depending on the increase ΔA of the attenuation amount.

After that, the processing in Step St21 and the subsequent processes are executed again. With this, the attenuation amount is increased by ΔA every time the processing in Step St24 is executed, and hence the power of the supervisory signal light Sc is gradually reduced to approach the minimum reception power Pco, which is the target value. The control processing of the attenuation amount is executed in this way.

As described above, the FPGA 10a of the transmission device 1a on the transmission side controls the attenuation amount of the VOA 21a so that the power Pc of the supervisory signal light Sc notified from the FPGA 10b of the transmission device 1b on the reception side approaches the given minimum reception power Pco. Thus, the transmission device 1a may set the minimum reception power Pco to a sufficiently small value within a range in which the required transmission quality of the supervisory signal light Sc is achieved, to thereby reduce the nonlinear optical effect without a reduction in supervisory control function.

The minimum reception power Pco is set to the minimum value of the power of light receivable by the SFP 20b, for example. This means that the transmission device 1a may reduce the power Pc of the supervisory signal light Sc, which the SFP 20b of the transmission device 1b on the reception side receives, as much as possible, and therefore reduce the nonlinear optical effect more effectively.

The minimum reception power Pco is set to the minimum value of the power of light receivable within the range of the reception characteristic specification of the SFP 20b, for example. As this minimum value, the minimum reception sensitivity defined by the reception characteristic specification of the SFP 20b is given, for example. The minimum reception sensitivity is the minimum value of reception power required for achievement of a transmission quality that the transmission system is supposed to provide, and is one of parameters representing the reception performance of the SFP 20b for each product model number in the market.

As an index value of the transmission quality, for example, a bit error rate is given. The minimum reception sensitivity is defined as the minimum value of reception power satisfying a condition that the bit error rate of the supervisory signal light Sc is equal to or smaller than a defined value allowable in the transmission system, for example.

Thus, the transmission device 1b may control, with the target value being the minimum reception sensitivity, the attenuation amount of the VOA 21a, to thereby more positively assure the transmission quality of the supervisory signal light Sc based on the reception characteristic specification of the SFP 20b. The minimum reception power Pco is stored in the memory 12a in advance.

The FPGA 10a stops control on the attenuation amount in the case where the difference between the power Pc of the supervisory signal light Sc and the minimum reception power Pco of the SFP 20b of the transmission device 1b on the reception side is equal to or smaller than the threshold THc, or the case where the difference between the attenuation amount of the VOA 21a and the upper limit value Am is equal to or smaller than the threshold THa.

Thus, the FPGA 10a may stop control on the attenuation amount when the attenuation amount reaches the upper limit value Am before the power Pc of the supervisory signal light Sc reaches the minimum reception power Pco. This means that the FPGA 10a does not accidentally set an attenuation amount exceeding the upper limit value Am to the VOA 21a.

The VOA 21a attenuates the supervisory signal light Sc that is input to the filter 33a. Thus, the VOA 21a only attenuates the supervisory signal light Sc of the supervisory signal light Sc and the main signal light Sm. The power of the main signal light Sm is consequently less affected by attenuation of the supervisory signal light Sc.

Second Embodiment

The VOA 21a, which only attenuates the supervisory signal light Sc as described above, may attenuate the supervisory signal light Sc and the main signal light Sm as described below.

Figure 5:
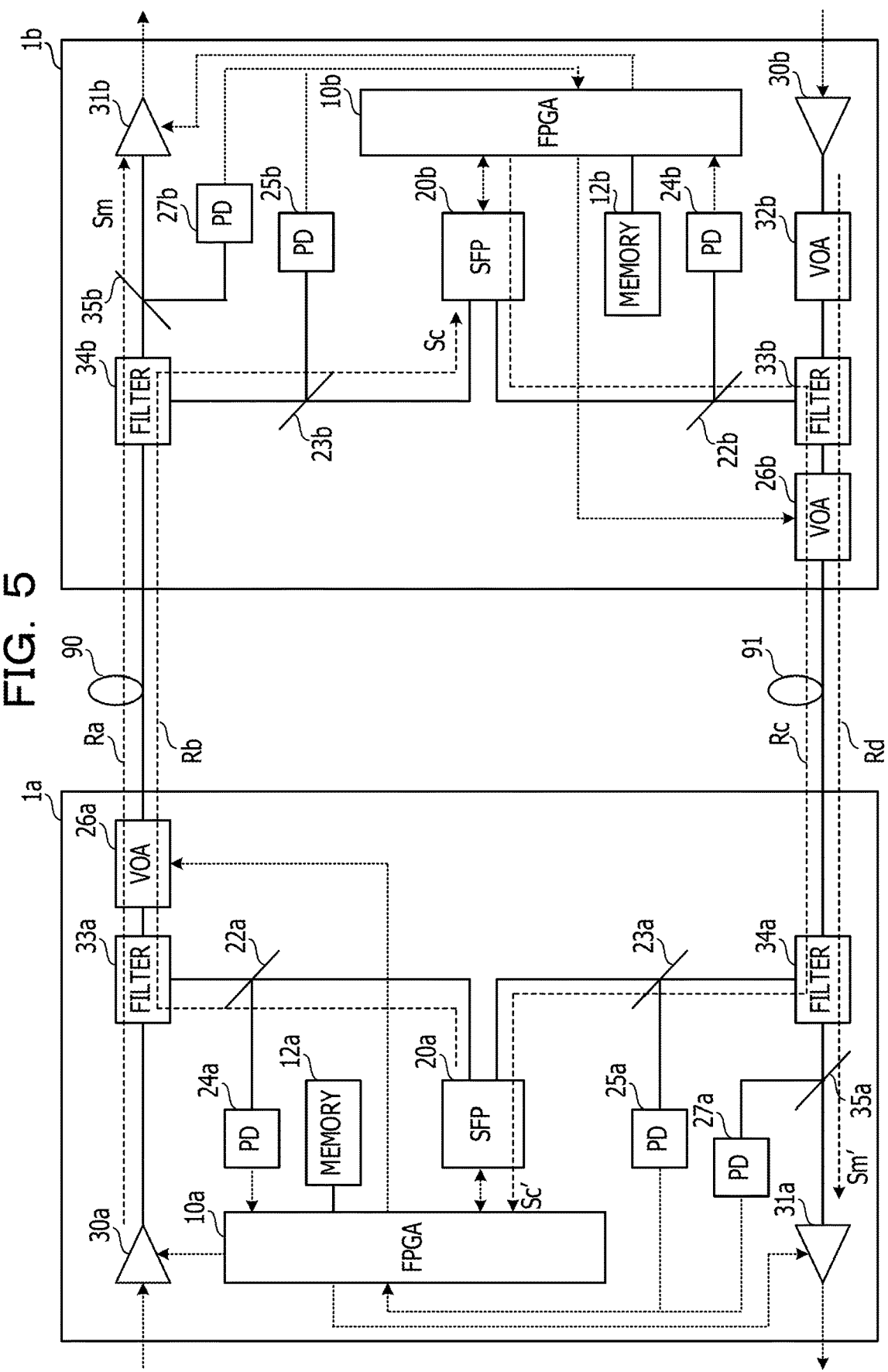
FIG. 5 is a configuration diagram illustrating a transmission system according to a second embodiment.

FIG. 5 is a configuration diagram illustrating a transmission system according to a second embodiment. In FIG. 5, configurations similar to those in FIG. 1 are denoted by the same reference symbols and description thereof is omitted.

A transmission device 1a includes, instead of the VOA 21a and the VOA 32a according to the first embodiment, a VOA 26a between the filter 33a and the transmission line 90. A transmission device 1b includes, instead of the VOA 21b and the VOA 32b according to the first embodiment, a VOA 26b between the filter 33b and the transmission line 91. The VOA 26a attenuates the supervisory signal light Sc and the main signal light Sm output from the filter 33a. The VOA 26b attenuates the supervisory signal light Sc' and the main signal light Sm' output from the filter 33b. The VOA 26a is an example of an attenuation unit.

The transmission device 1a attenuates the supervisory signal light Sc and the main signal light Sm by one VOA of the VOA 26a, and hence does not require two VOAs of the VOAs 21a and 32a unlike the first embodiment. The cost and scale of the transmission device 1a are thus reduced. The transmission device 1b attenuates the supervisory signal light Sc' and the main signal light Sm' by one VOA of the VOA 26b, and hence the cost and scale of the transmission device 1b are reduced.

The transmission device 1b includes an optical splitter 35b and a PD 27b to detect the power of the main signal light Sm input through the transmission line 90. The optical splitter 35b is provided between the filter 34b and the optical amplifier 31b. The optical splitter 35b introduces the main signal light Sm to the optical amplifier 31b and the PD 27b in a separate manner.

The PD 27b performs optical-electrical conversion on the main signal light Sm to detect the power of the main signal light Sm. Information on the power of the main signal light Sm (power information) is notified from the PD 25b to the FPGA 10b. The PD 27b is an example of a second detection unit.

The FPGA 10b inserts the power information on each of the supervisory signal light Sc and main signal light Sm into the payload data of the supervisory signal light Sc', which is light in the opposite direction, to thereby output the power information to the SFP 20b. With this, the power of the supervisory signal light Sc and main signal light Sm is notified from the transmission device 1b on the reception side to the transmission device 1a on the transmission side along the path Rc.

The transmission device 1a includes, like the transmission device 1b, an optical splitter 35a and a PD 27a to detect the power of the main signal light Sm' input through the transmission line 91. The PD 27a detects the power of the main signal light Sm' subjected to separation by the optical splitter 35a and notifies the FPGA 10a of the power.

The FPGA 10a of the transmission device 1a on the transmission side controls the attenuation amount of the VOA 26a so that the power of the main signal light Sm does not fall below the lower limit value thereof in the control processing described above.

Figure 6:
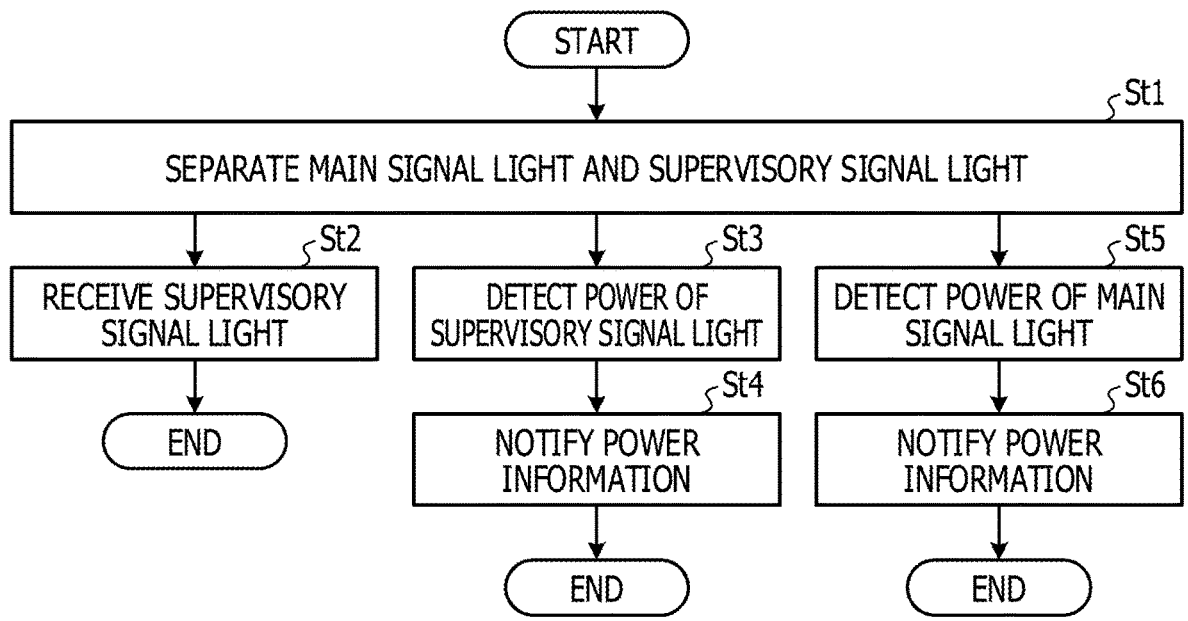
FIG. 6 is a flow chart illustrating an example of processing of supervisory signal light and main signal light in a transmission device on a reception side.

FIG. 6 is a flow chart illustrating an example of processing of the supervisory signal light Sc and main signal light Sm in the transmission device 1b on the reception side. In FIG. 6, processes similar to those in FIG. 2 are denoted by the same reference symbols and description thereof is omitted. In FIG. 6, the processing in Step St2, the processing in each of Steps St3 and St4, and the processing in each of Steps St5 and St6 are performed in parallel to each other. This processing is executed repeatedly.

After the filter 34b separates the main signal light Sm and the supervisory signal light Sc (Step St1), the PD 27b detects the power of the main signal light Sm (Step St5). Next, the FPGA 10b notifies the transmission device 1a on the transmission side of the power information on the main signal light Sm (Step St6). The transmission device 1b on the reception side processes the supervisory signal light Sc and the main signal light Sm in this way.

Figure 7:
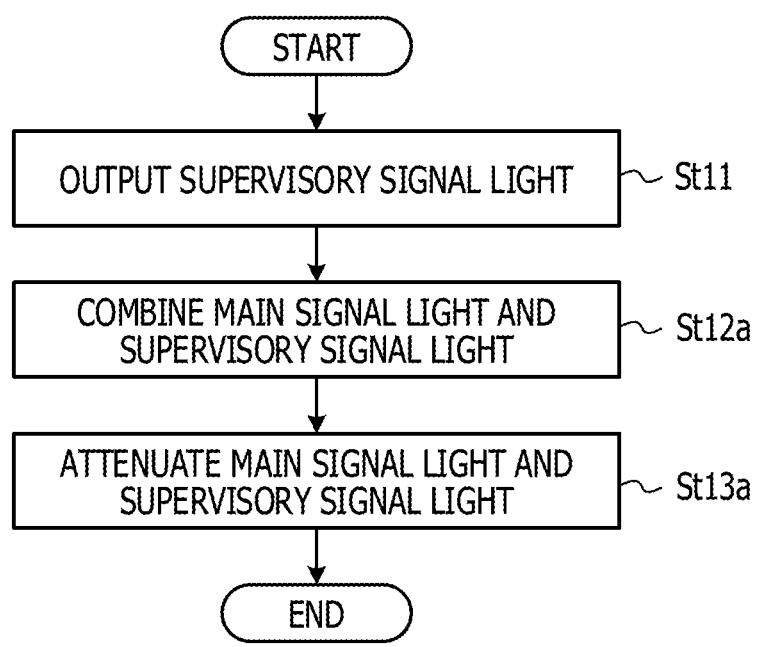
FIG. 7 is a flow chart illustrating an example of transmission processing of supervisory signal light and main signal light in a transmission device on a transmission side.

FIG. 7 is a flow chart illustrating an example of transmission processing of the supervisory signal light Sc and main signal light Sm in the transmission device 1a on the transmission side. This processing is executed repeatedly.

After the supervisory signal light Sc is output (Step St11), the filter 33a combines the supervisory signal light Sc and the main signal light Sm (Step St12a). Next, the VOA 26a attenuates the supervisory signal light Sc and the main signal light Sm by the attenuation amount set by the FPGA 10a (Step St13a). Thus, the supervisory signal light Sc and the main signal light Sm are attenuated by the same amount. The transmission device 1a on the transmission side executes the transmission processing of the supervisory signal light Sc and main signal light Sm in this way.

Figure 8:
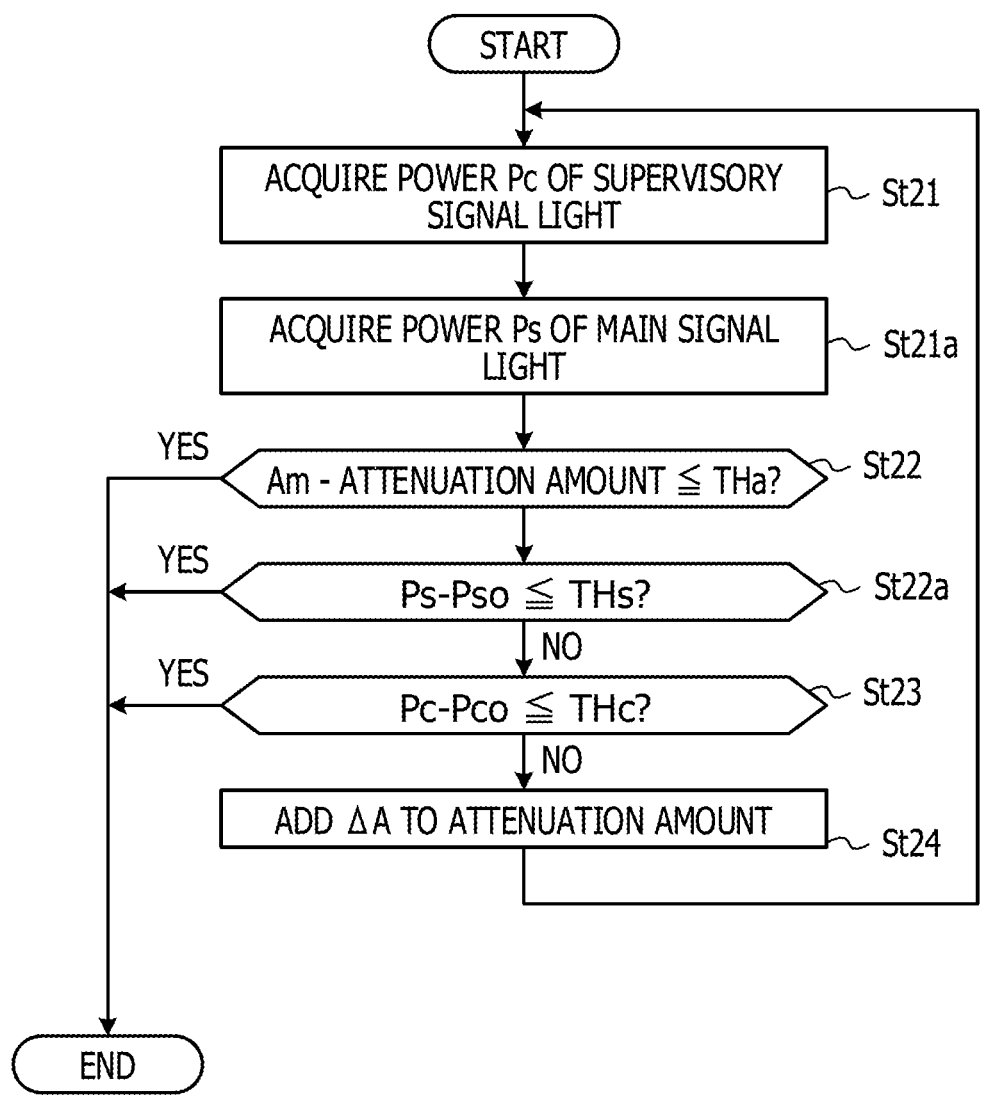
FIG. 8 is a flow chart illustrating another example of control processing of an attenuation amount in a transmission device on a transmission side.

FIG. 8 is a flow chart illustrating another example of the control processing of the attenuation amount in the transmission device 1a on the transmission side. In FIG. 8, processes similar to those in FIG. 4 are denoted by the same reference symbols and description thereof is omitted. Prior to the processing, the attenuation amount of the VOA 26a is set to a lower limit value.

After acquiring the power Pc of the supervisory signal light Sc (Step St21), the FPGA 10a acquires power Ps of the main signal light Sm indicated by the power information (Step St21a). The processing in Step St21a may be executed prior to the processing in Step St21.

Next, the FPGA 10a performs the determination processing in Step St22 on a current attenuation amount of the VOA 26a. In a case where a difference between the upper limit value Am and the attenuation amount is equal to or smaller than the threshold THa (Yes in Step St22), the FPGA 10a ends the processing.

In a case where the difference between the upper limit value Am and the attenuation amount is larger than the threshold THa (No in Step St22), the FPGA 10a compares, to a threshold THs, a difference between the power Ps of the main signal light Sm and a lower limit value Pso of the power Ps (Step St22a). The lower limit value Pso is the minimum value of power required for transmission of the main signal light Sm to the adjacent node, for example, and is determined based on conditions including the length of a transmission line extended to the adjacent node.

In a case where the difference between the power Ps and the lower limit value Pso is equal to or smaller than the threshold THs (Yes in Step St22a), the FPGA 10a ends the control processing to reduce a deterioration in transmission quality due to the power Ps falling below the current value. The threshold THs is an example of a third threshold, and is a value small enough that, with the difference equal to or smaller than the threshold THs, the power Ps may be regarded as being substantially equal to the lower limit value Pso.

In a case where the difference between the power Ps and the lower limit value Pso is larger than the threshold THs (No in Step St22a), the FPGA 10a executes the determination processing in Step St23. The FPGA 10a adds ΔA to the attenuation amount of the VOA 26a (Step St24). At this time, the FPGA 10a sets an attenuation amount increased by ΔA to the VOA 26a. Thus, the power of the supervisory signal light Sc and main signal light Sm that are transmitted from the transmission device 1a on the transmission side is reduced depending on the increase ΔA of the attenuation amount. The control processing on the attenuation amount is executed in this way.

As described above, the FPGA 10a stops control on the attenuation amount in the case where the difference between the power Pc of the supervisory signal light Sc and the minimum reception power Pco of the SFP 20b of the transmission device 1b on the reception side is equal to or smaller than the threshold THc, the case where the difference between the attenuation amount of the VOA 26a and the upper limit value Am is equal to or smaller than the threshold THa, or the case where the difference between the power Ps of the main signal light Sm and the lower limit value Pso is equal to or smaller than the threshold THs.

Thus, the FPGA 10a may stop control on the attenuation amount when the attenuation amount reaches the upper limit value Am before the power Pc of the supervisory signal light Sc reaches the minimum reception power Pco. The FPGA 10a may stop control on the attenuation amount when the power Ps of the main signal light Sm reaches the lower limit value Pso before the power Pc of the supervisory signal light Sc reaches the minimum reception power Pco. As a result, a deterioration in transmission quality due to the power Ps of the main signal light Sm falling below the lower limit value Pso is reduced.

In each embodiment described above, the power information on the main signal light Sm or supervisory signal light Sc is notified from the transmission device 1b on the reception side to the transmission device 1a on the transmission side along the path Re including the transmission line 91, but the present technology is not limited thereto. The FPGA 10b of the transmission device 1b on the reception side may notify the transmission device 1a on the transmission side of the power information through a network element operation system (NE-OpS) (not illustrated) configured to control each of the transmission devices 1a and 1b, for example.

In each embodiment described above, the attenuation amounts of the VOAs 21a and 26a are controlled by the FPGA 10a, but the present technology is not limited thereto. The attenuation amounts may be controlled by a processor, such as a central processing unit (CPU), operating based on software, for example.

In the example of each embodiment described above, the transmission device 1a corresponds to the transmission side and the transmission device 1b corresponds to the reception side. Also in a case where the transmission device 1b corresponds to the transmission side and the transmission device 1a corresponds to the reception side, however, the power of the supervisory signal light Sc' may be appropriately controlled by processes similar to those described above.

The embodiments described above are preferred embodiments of the present technology. The present technology is, however, not limited to the embodiments, and various modifications may be made thereto within the range not departing from the gist of the present technology.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission system, comprising:
a first transmission device configured to transmit main signal light to a transmission line; and
a second transmission device configured to receive the main signal light from the first transmission device through the transmission line, wherein
the first transmission device includes
a transceiver configured to output supervisory signal light including information on supervisory control on the first transmission device and the second transmission device,
an attenuator configured to attenuate the supervisory signal light,
a combiner configured to combine the supervisory signal light to the main signal light, and
a control circuit configured to control an attenuation amount of the attenuator,
the second transmission device includes
a splitter configured to separate the main signal light and the supervisory signal light input through the transmission line,
a first detector configured to detect power of the supervisory signal light,
a receiver configured to receive the supervisory signal light, and
a notification circuit configured to notify the first transmission device of the power of the supervisory signal light detected by the first detector, and
the control circuit adds, when the power of the supervisory signal light is within a range of a reception characteristic specification of the receiver and a difference between the power of the supervisory signal light and a minimum value of power of light receivable by the receiver is greater than or equal to a predetermined value, a value to the attenuation amount of the attenuator so that the power of the supervisory signal light notified from the notification circuit approaches the minimum value of power of light receivable by the receiver.

2. The transmission system according to claim 1, wherein the control circuit controls the attenuation amount of the attenuator so that the power of the supervisory signal light notified from the notification circuit approaches the minimum value of power of light receivable within the range of the reception characteristic specification of the receiver.

3. The transmission system according to claim 1, wherein the attenuator attenuates the supervisory signal light that is input to the combiner.

4. The transmission system according to claim 3, wherein the control circuit stops control on the attenuation amount of the attenuator in one of a case where the difference is equal to or smaller than a first threshold, and a case where a difference between the attenuation amount and an upper limit value of the attenuation amount is equal to or smaller than a second threshold.

5. The transmission system according to claim 1, wherein the attenuator attenuates the supervisory signal light and the main signal light output from the combiner.

6. The transmission system according to claim 1, wherein the second transmission device includes a second detector configured to detect power of the main signal light,
the notification circuit notifies the first transmission device of the power of the supervisory signal light detected by the first detector and the power of the main signal light detected by the second detector, and
the control circuit stops control on the attenuation amount of the attenuator in one of a case where the difference is equal to or smaller than a first threshold, a case where a difference between the attenuation amount and an upper limit value of the attenuation amount is equal to or smaller than a second threshold, and a case where a difference between the power of the main signal light notified from the notification circuit and a lower limit value of the power of the main signal light is equal to or smaller than a third threshold.

7. A transmission device configured to transmit main signal light to another transmission device through a transmission line, the transmission device comprising:
a transceiver configured to output supervisory signal light including information on supervisory control on the transmission device and the other transmission device;
an attenuator configured to attenuate the supervisory signal light;
a combiner configured to combine the supervisory signal light to the main signal light; and
a control circuit configured to add, when the power of the supervisory signal light is within a range of a reception characteristic specification of a receiver and a difference between the power of the supervisory signal light and a minimum value of power of light receivable by the receiver is greater than or equal to a predetermined value, a value to an attenuation amount of the attenuator so that power of the supervisory signal light received by the other transmission device approaches the minimum value of power of light receivable by a receiver of the other transmission device.

8. The transmission device according to claim 7, wherein the control circuit controls the attenuation amount of the attenuator so that the power of the supervisory signal light received by the other transmission device approaches the minimum value of power of light receivable within the range of the reception characteristic specification of the receiver.

9. The transmission device according to claim 7, wherein the attenuator attenuates the supervisory signal light that is input to the combiner.

10. The transmission device according to claim 7, wherein the control circuit stops control on the attenuation amount of the attenuator in one of a case where the difference is equal to or smaller than a first threshold, and a case where a difference between the attenuation amount and an upper limit value of the attenuation amount is equal to or smaller than a second threshold.

11. The transmission device according to claim 7, wherein the attenuator attenuates the supervisory signal light and the main signal light output from the combiner.

12. The transmission device according to claim 7, wherein the control circuit stops control on the attenuation amount of the attenuator in one of a case where the difference is equal to or smaller than a first threshold, a case where a difference between the attenuation amount and an upper limit value of the attenuation amount is equal to or smaller than a second threshold, and a case where a difference between power of the main signal light received by the other transmission device and a lower limit value of the power of the main signal light is equal to or smaller than a third threshold.

13. A transmission method for transmitting main signal light from a first transmission device to a second transmission device through a transmission line, the transmission method comprising:
by the first transmission device,
outputting supervisory signal light including information on supervisory control on the first transmission device and the second transmission device,
attenuating the supervisory signal light by an attenuator,
combining the supervisory signal light to the main signal light;
by the second transmission device,
separating the main signal light and the supervisory signal light input through the transmission line,
detecting power of the supervisory signal light by a first detector,
receiving the supervisory signal light by a receiver,
notifying the first transmission device of the power of the supervisory signal light detected by the first detector; and
by the first transmission device, adding, when the power of the supervisory signal light is within a range of a reception characteristic specification of the receiver and a difference between the power of the supervisory signal light and a minimum value of power of light receivable by the receiver is greater than or equal to a predetermined value, a value to an attenuation amount of the attenuator so that the power of the supervisory signal light notified from the second transmission device approaches the minimum value of power of light receivable by the receiver.

14. The transmission method according to claim 13, further comprising:
controlling the attenuation amount of the attenuator so that the power of the supervisory signal light notified from the second transmission device approaches the minimum value of power of light receivable within the range of the reception characteristic specification of the receiver.

15. The transmission method according to claim 13, wherein
the attenuator attenuates the supervisory signal light that is combined to the main signal light.

16. The transmission method according to claim 13, further comprising:
stopping control on the attenuation amount of the attenuator in one of a case where the difference between is equal to or smaller than a first threshold, and a case where a difference between the attenuation amount and an upper limit value of the attenuation amount is equal to or smaller than a second threshold.

17. The transmission method according to claim 13, wherein
the attenuator attenuates the supervisory signal light and the main signal light combined.

18. The transmission system according to claim 1, wherein
the control circuit adds the value to the attenuation amount of the attenuator when a difference between the power of the supervisory signal light and the minimum value of power of light is larger than the threshold.

* * * * *